United States Patent [19]
Searle

[11] Patent Number: 5,853,119
[45] Date of Patent: Dec. 29, 1998

[54] FRICTION WELDING APPARATUS

[75] Inventor: John G Searle, Cannock, Great Britain

[73] Assignee: Rolls-Royce PLC, London, England

[21] Appl. No.: 766,759

[22] Filed: Dec. 13, 1996

[30] Foreign Application Priority Data

Dec. 20, 1995 [GB] United Kingdom .................. 9526038

[51] Int. Cl.⁶ ................................................. B23K 20/12
[52] U.S. Cl. ...................... 228/112.1; 228/2.1; 156/73.5
[58] Field of Search ................................. 228/2.1, 112.1; 156/73.5

[56] References Cited

U.S. PATENT DOCUMENTS

| | | | |
|---|---|---|---|
| 3,420,428 | 1/1969 | Maurya et al. | 228/2.1 |
| 3,542,275 | 11/1970 | Loyd et al. | 228/2.1 |
| 3,705,678 | 12/1972 | Searle | 228/2.1 |

FOREIGN PATENT DOCUMENTS 1391836  4/1988  U.S.S.R. ............................. 228/112.1

Primary Examiner—Patrick Ryan
Assistant Examiner—Jeffrey T. Knapp
Attorney, Agent, or Firm—Oliff & Berridge, PLC

[57] ABSTRACT

Variable amplitude, linear reciprocation of an output ram is produced by converting rotary motion into linear motion using a swash plate connected by a bending element to drive a crank. The rotary prime mover and swash plate are mounted on a pivotable frame so as the axial throw of the swash plate is determined by the angular offset of the rotational axes of the swash plate and crank. When the axes are coincident the throw, and therefore the ram stroke, is zero but progressive angular displacement produces a progressively increased stroke. Thus, the frequency of reciprocation is determined by the angular speed of the prime mover, and the stroke is controllably variable between maximum and zero.

19 Claims, 6 Drawing Sheets

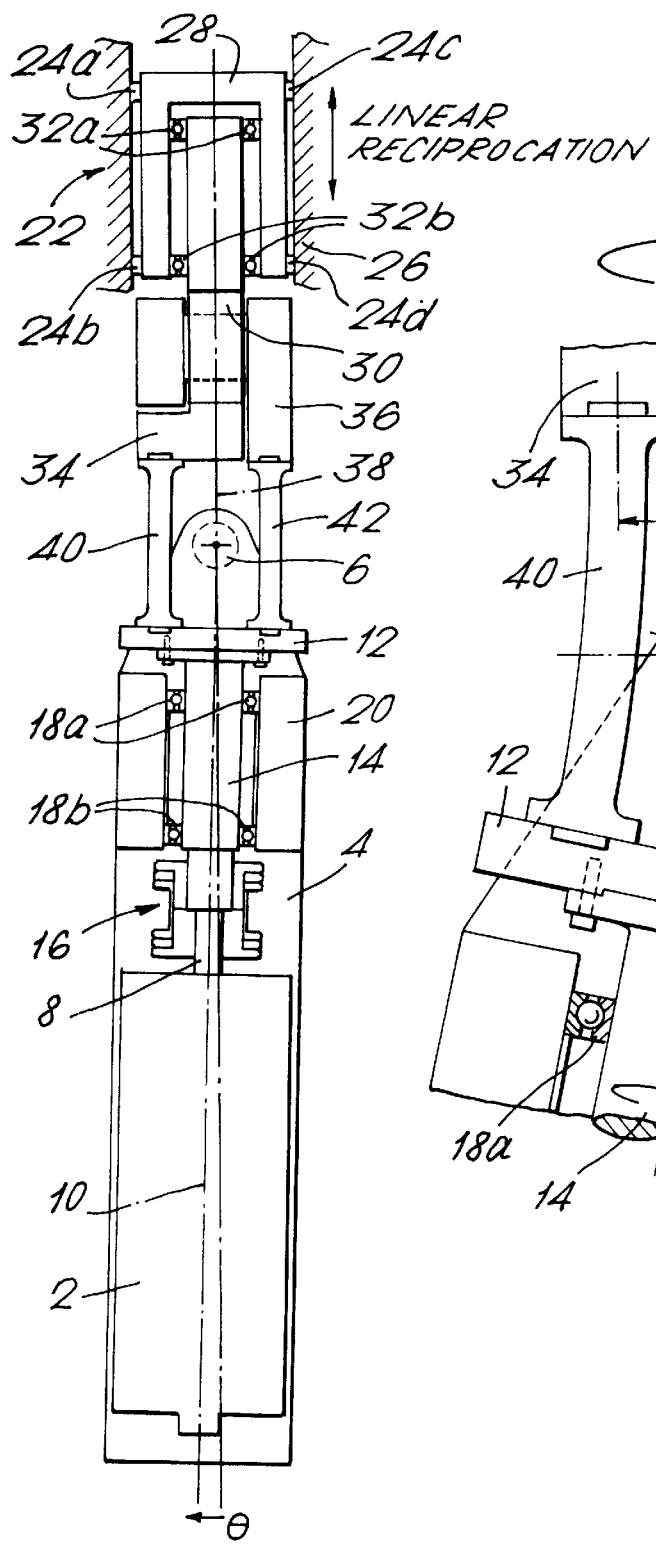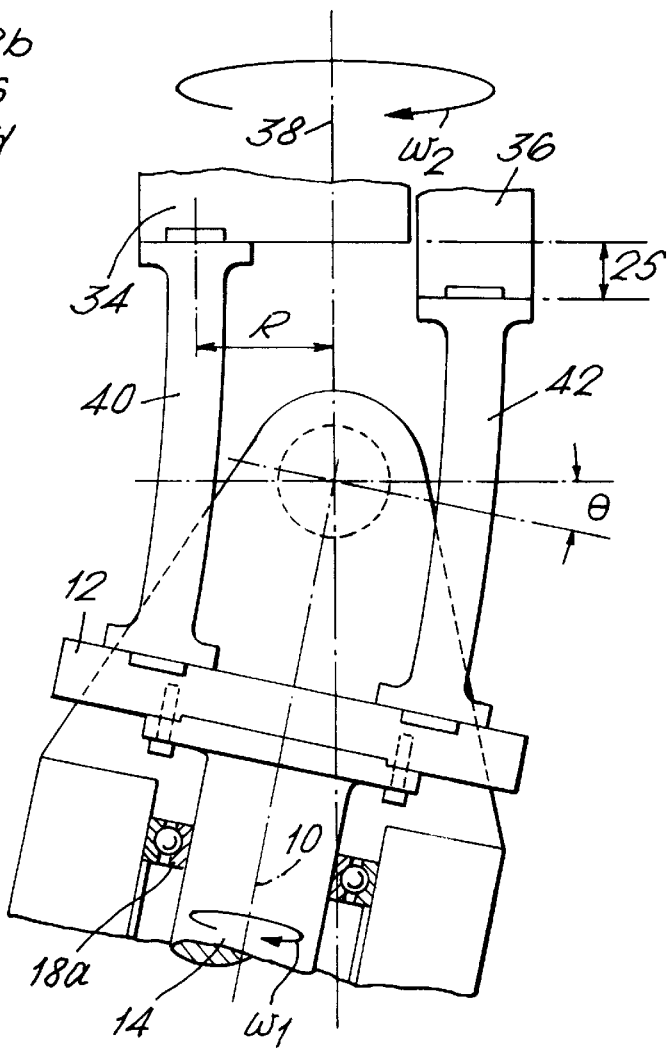

FRICTION WELDING APPARATUS

The invention relates to friction welding apparatus. In particular, but not exclusively the invention concerns a linear friction welding oscillator.

Linear friction welding is a technique of joining two components, or a component to a workpiece, by moving one component relative to the other in a linearly reciprocal movement while urging the interface surfaces together with a force to generate frictional heat sufficient to produce a weld. Once sufficient heat has been generated relative motion is ceased while the force urging the components together is maintained to create the weld. Therefore, the relative position of components when motion is ceased is critical.

According to the present invention there is provided a linear friction welding oscillator comprising a rotary prime mover and a swash plate mounted on a pivotable yoke in which the rotational axis of the swash plate intersects the pivotal axis of the yoke, an oscillator output ram mounted for linear reciprocal movement along an axis which also passes through the intersection point, and coupling means for transmitting the motion of the swash plate to the ram such that the stroke of the ram is determined by the angular misalignment between the linear axis of the ram and the rotary axis of the swash plate, whereby the amplitude of the movement of the output ram is controllable by swinging the yoke.

In a preferred form of the invention the coupling means for transmitting the motion of the swash plate to the ram comprises a crank rotatably mounted on the linear ram axis and driven by a flexible, inextensible ligament connected to the swash plate at a location offset from its centre of rotation.

The greater the offset of the ligament, the smaller the angular misalignment required between the ram and the swash plate to achieve a particular stroke of the ram.

A linear friction welding (LFW) oscillator as above with such a coupling means works well at a cyclic frequency of 50 Hz or less. Above this, however, the ligament is subjected to elevated centrifugal forces which cause it to bend and stress unduly. For a high speed LFW oscillator, say of 50–180 Hz, it is preferable to use an alternative coupling means.

Such coupling means may comprise a ball and socket arrangement. A socket may be provided on the swash plate or a connector attached thereto. The ball may be provided on the crank or a connector attached thereto.

The ball is offset from the centre of rotation of the prime mover, rotation of the prime mover causing rotation of the crank and, if the prime mover is misaligned, reciprocation of the ram.

The ball may be held on a peg between the swash plate and the crank, or between connectors attached thereto.

The ball may be provided with a counterbalance, or tail. The socket may comprise a skirt to accommodate the tail of the ball. The centre of gravity of the ball and tail may coincide with the centre of rotation of the prime mover. This reduces the centrifugal force on the ball and tail, allowing the linear friction welding oscillator to operate at greater speeds of rotation. This also prevents unwanted vibration.

According to another aspect the invention comprises a linear friction welding machine having a rotating input drive shaft rotatable about a first axis, a rotating output drive shaft rotatable about a second axis, coupling means adapted to couple the input drive shaft with the output shaft for rotational movement thereby to drive the output shaft, axis movement means adapted to move the angle of the input drive shaft first axis relative to the second axis; and in which the coupling means comprises an input component rotatable with the input drive shaft, and an output component rotatable with the output shaft, the arrangement being such that when the first and second axes are aligned the input component rotates so as to have no axial movement in the direction of the second axis, but when the first axis is inclined relative to the second axis the input component rotates so as to have a part of it rotate such that at some point in the revolution of the input member said part is in a forward position to the direction of the second axis, and at other parts of the rotation of the input member said part is in a position that is backwards relative to the direction of the second axis, the coupling of the input component to the output component hereby reciprocating the output component in the direction of the second axis, and hence reciprocating the output shaft in the direction of the second axis.

Preferably the input component has a push contact surface and a pull contact surface which engage, respectively, with pushed and pulled contact surfaces of the output component.

Preferably the push and pull contact surfaces engage slidably with the pushed and pulled contact surfaces so as to allow relative sliding movement therebetween. This sliding movement has a component in a direction transverse to said second axis.

Preferably said output component comprises a first member provided with said pushed and pulled surfaces and being slidably mounted on a second member and capable of reciprocating sliding movement relative to said second member in a direction transverse to said second axis.

Preferably said push and pull surfaces comprise curved surfaces, most preferably spherically curved surfaces. The input component may comprise one of a ball member or socket member, and the output component may comprise the other of them.

Preferably the output component is balanced about the second axis: its centre of gravity lying on the second axis so as to minimise the centripetal forces acting on the output component when it rotates about a second axis.

The coupling means may comprise a ball slidably mounted on a pin, and mounted so as to have a socket formation angularly movable relative to it. The pin may be supported by two spaced apart locations, for example by a yoke support member. Alternatively, the pin may be supported at one end only, for example in a cantilever fashion.

The output shaft may be coupled to counterbalance means adapted to reciprocate so as substantially to counterbalance momentum changes in the output shaft in the direction of the second axis. Preferably the centre of gravity of the output shaft and counterbalance means combined remains unchanged as the output shaft and counterbalance means reciprocate. The centre of gravity is in the embodiments shown on the output axis.

The counterbalance means is such that the inertial forces required to accelerate it match those required to accelerate the output shaft (linearly) so that the net force on the frame of the machine is zero.

The counterbalance means may comprise a mass guided for linear reciprocal movement. Preferably the counterbalance means is substantially symmetric about the second axis. The counterbalance means may comprise a pivoted rocker coupled at one end to the output shaft, and at the other end to a counterbalance mass. The coupling is preferably via flexible linking members, such as flexible blades. Preferably the combined mass of the counterbalance means is substantially the same as the mass of the output shaft.

Preferably the bearing surfaces of the output component that bear against the second member are relatively small, and spaced apart. This may help to assist in preventing the output component from twisting about the second member, and may assist in lubricating it.

Preferably the input and/or output components of the coupling means are not centrifugally biased continuously in the same direction. Preferably the input/output components experience biasing forces which are cyclically applied and not applied. This may assist in lubrication, for example in squeeze film lubrication.

There are preferably axial thrust bearings on the input shaft and/or the output shaft. The thrust bearings preferably operate on the squeeze film lubrication principle. We may use as axial thrust bearings a disc held in a groove.

Angular momentum storing means may be provided on the input and/or output shaft. The angular momentum storing means may comprise a flywheel. This may enable us to use a motor of smaller power than would be possible if all the energy to form a weld were to be derived contemporaneously from the motor directly.

According to a further aspect we provide a method of linear friction welding comprising rotating an input member about a first axis; constraining an output member to rotate about a second axis; coupling the input member to the output member so that rotation of the input member rotates the output member; mounting the output member so as to be linearly reciprocable in the direction of the second axis; and mis-aligning the first and second axes so that a part of the first member has a reciprocatory movement forwards and backwards in the direction of the second axis as the first member rotates about the misaligned first axis, the second member being carried forwards and backwards in the direction of the second axis by the first member, as well as rotating about the second axis.

The invention and how it may be carried into practice will now be described in detail with particular reference to three embodiments illustrated in the accompanying drawings, in which:

FIG. 1 shows an overall view of a linear friction welding oscillator:

FIG. 2 shows a detailed view of a flexible, inextensible ligament coupling between swash plate and reciprocal crank arrangement;

Figure 3:
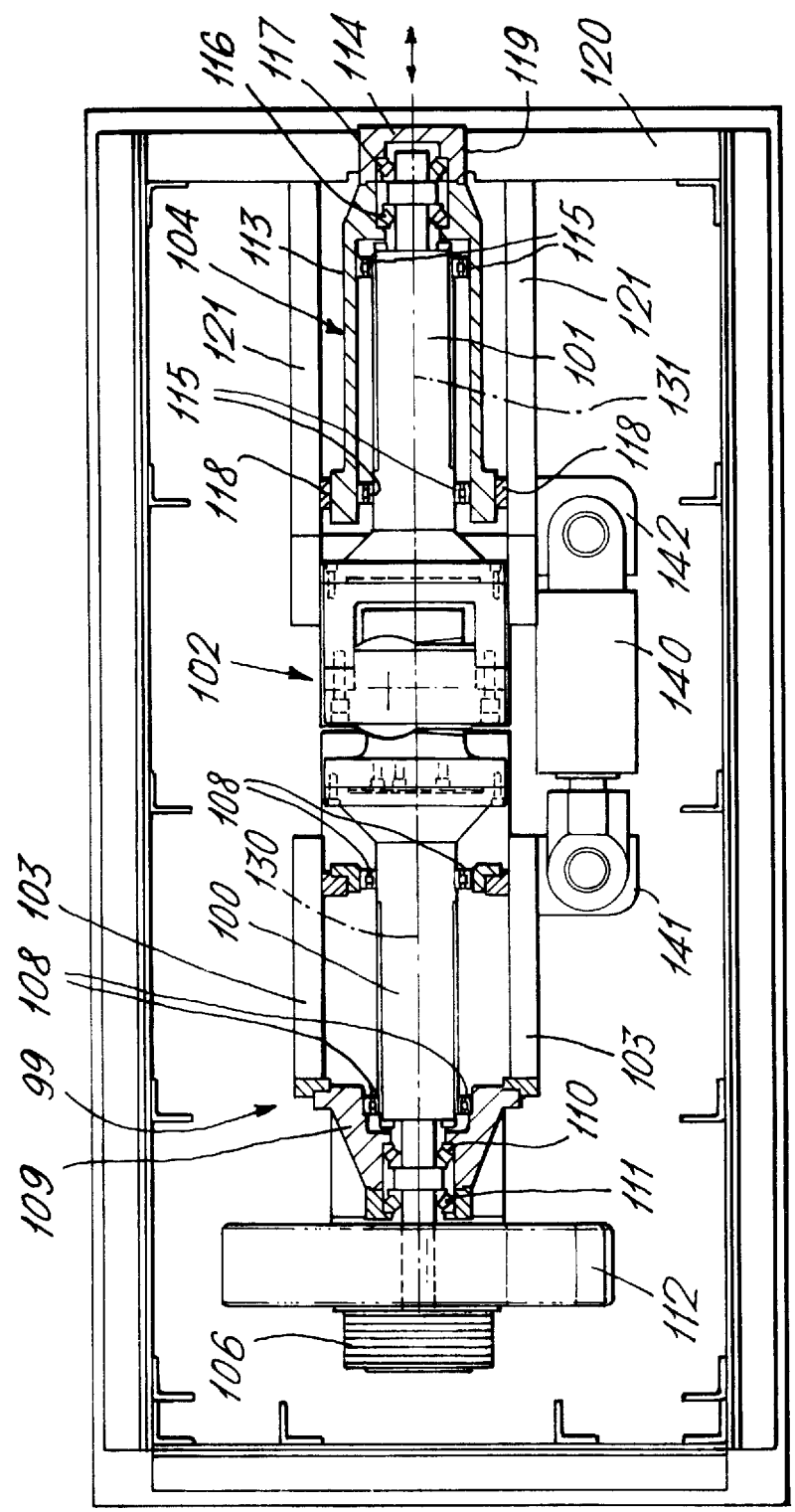
FIG. 3 shows a plan view of another linear friction welding apparatus.

The oscillator of FIG. 1 comprises a prime mover 2 in the form of an electric motor rigidly mounted on a frame or yoke 4 which is pivoted at one end about a pivot axis 6. The electric motor 2 has an output shaft 8 and is mounted on the yoke 4 so that the motor axis 10 intersects the pivot axis 6. The output shaft 8 drives a swash plate 12 through a shaft 14 and coupling 16. The shaft 14 is journalled in bearings 18a,18b which are securely mounted in a portion 20 of the frame 4. The bearings 18a,18b and shaft 14 are also arranged co-axially with the motor shaft 8 and motor axis 10.

The linear oscillator output ram 22 is mounted for linear reciprocation with the ram output member 28 slidably mounted. In the preferred arrangement member 28 has a square cross-section which is slidably mounted by means of sliding pads 24a,24b within a square hole formed through a stationary or earth member. In an alternative arrangement the ram output member is supported by means of a suspension arrangement. In another arrangement the output member 28 is restrained by sliding keys engaged in axial slots formed in an earth reference member 26. In the particular embodiment the ram, shown in section in FIG. 1 is carried on the journal portion of a crank 30 by means of bearings 32a,32b. The inner races of these bearings are securely fixed to the journal portion of crank 30 while the outer races are securely fixed in the interior of cylinder 28. Therefore the bearings 32a,32b are capable of transmitting an axial load from crank 30 while retaining freedom to rotate relative thereto.

The crank 30 is formed at one end with an offset 34 and is mounted concentrically with an annular balance weight 36 mounted on the crank 30. Preferably the crank 30 is formed with a square cross-section on which the balance weight is slidably mounted, this is feasible since the crank and balance weight do not rotate relative one to the other but only reciprocate. The end faces of crank offset 34 and balance weight 36 are substantially co-planar, at least in the zero-offset position, and these two components are mounted for rotation about a crank axis 38. The crank and balance weight are connected respectively by means of flexible, inextensible ligaments or elements 40,42 to the swash plate 12. The so-called ligaments or elements 40,42 in the particular embodiment comprise elongate titanium elements which have flanged ends for attachment between the swash plate 12 and the crank offset 34 and balance weight 26. In one form of the invention these items may be formed separately and joined together, for example bolted together. Alternatively, the components comprising crank 30, offset 34, bending element 40, swash plate 12 and shaft 14 may be formed integrally.

The arrangement, therefore, is that the driving portion of the oscillator comprising the pivotable yoke 4 and parts mounted thereon is capable of being swung about the pivot axis 6 while crank 30 and balance weight 36 are free to rotate and execute linear reciprocal motion, and ram cylinder 28 is free only to reciprocate in an axial direction. These different motions on opposite sides of pivot axis 6 are linked by means of the bending elements 40,42 the operation of which may be better understood from the more detailed illustration of FIG. 2.

In operation, the electric motor 2 is energised to rotate swash plate 12 about the motor axis 10. Depending upon the angular orientation of motor axis 10 relative to crank axis 38 the ram 22 will execute linear reciprocation with a variable amplitude. This amplitude may be controlled by pivoting the yoke 4 carrying the motor 2 and swash plate 12 about the pivot axis 6.

The more detailed illustration of FIG. 2 shows the yoke 4 pivoted through an angle theta (θ) of approximately 1.37°, although this is exaggerated in the illustration for clarity. Therefore axis 10 subtends angle theta (θ) with respect to axis 38 at the point of mutual intersection with pivot axis 6. As a result the face of swash plate 12 is no longer perpendicular to the axis 38 and, as the plate 12 rotates, the mounting points of elements 40,42 do not remain at a constant distance from such a perpendicular plane. In fact, the mounting points move towards and away from the plane with a frequency equal to the frequency of rotation of plate 12 and with an amplitude determined by the magnitude of angle theta (θ).

Since the opposite ends of elements 40,42 are attached to crank offset 34 and balance weight 36 respectively the motion of those components is a combination of rotation around axis 38 and axial reciprocation with respect thereto. The crank balance weight 36 is not connected to any portion of ram 22 but crank 30 is rotatably mounted by means of bearings 32a,32b to ram output member 28. Therefore crank 30 is free to rotate relative to the ram output member 28 but the member, in turn, is restrained from rotation and is able only to reciprocate linearly in the axial direction of axis 38. Calculations show that where the mounting radius of elements 40,42 on swash plate 12 is 125 mm an angularly offset of 1.37° will generate linear reciprocation with an amplitude of 3 mm.

Now, when the motor frame 4 is swung back so that motor axis 10 lies co-axially with crank axis 38 the motion of element mounting points on swash plate 12 is pure rotation and gives rise to no linear reciprocation of crank 30. Therefore, the amplitude of linear reciprocation can be controlled simply by pivotal alignment of motor frame 4.

In the illustrated arrangement the bending elements 40,42 are shown mounted on the swash plate at equal radii, and therefore the masses of the crank and balance weight are equal in order to achieve the necessary balance. Of course, the connecting elements need not be connected at equal radii, in which case they would not be equal masses in order to achieve a balance. In general the mass required to balance is in inverse proportion to the radius at which it is coupled to the drive member.

Figure 4:
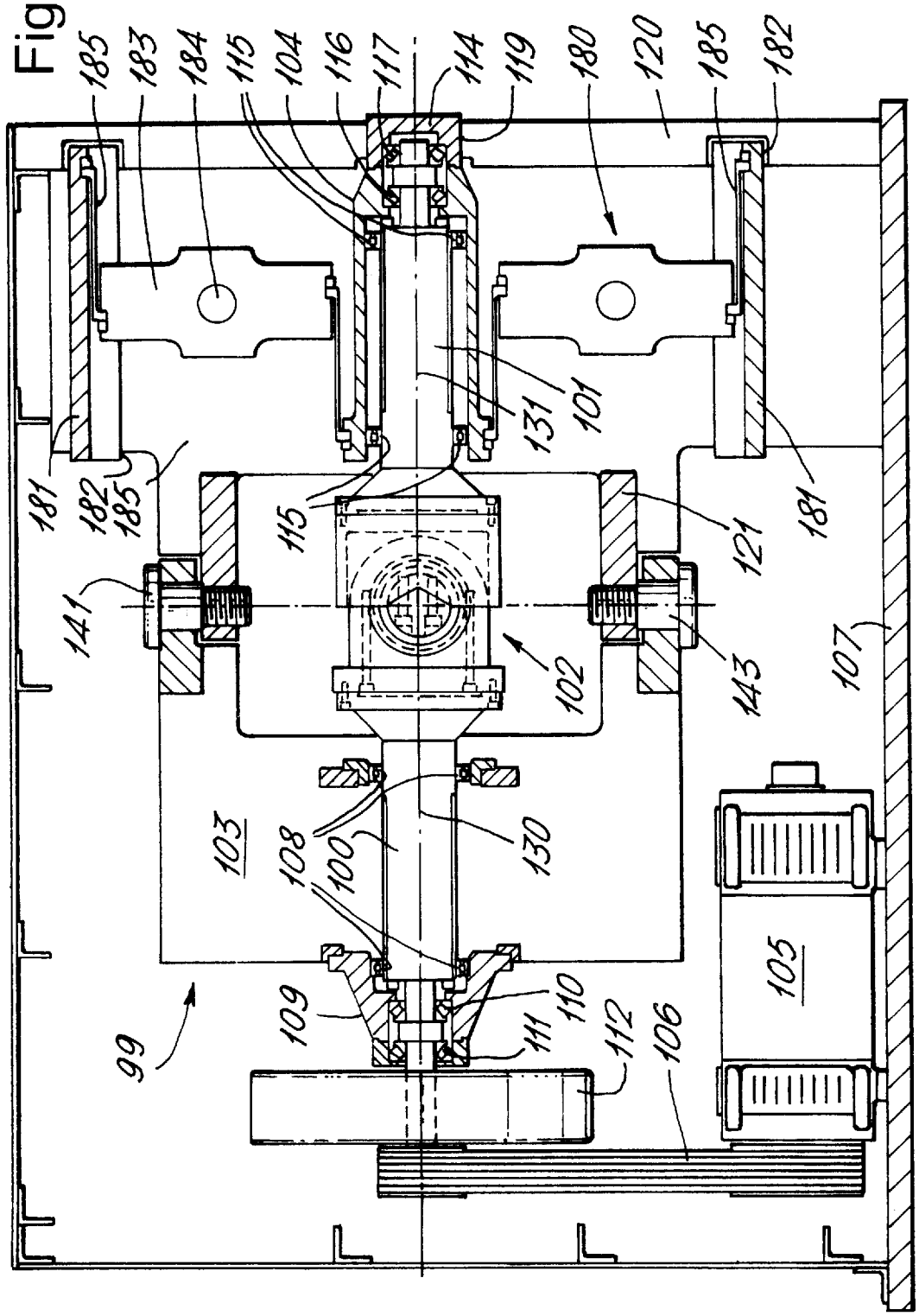
FIG. 4 shows a side-view of the apparatus of FIG. 3.

FIGS. 3 and 4 show another embodiment of linear friction welding machine 99. This machine is designed to apply a 25 tonne axial load and run at speed of up to 120 Hz. An input drive shaft 100 is coupled to an output shaft 101 via coupling means 102, and the input shaft is journalled for rotation in a support yoke (or support member) 103 (not shown in FIG. 3), with the output shaft 101 being journalled for rotation in a linearly reciprocating member 104. An electric motor 105 drives the input shaft 100 via a plurality of drive belts 106. The machine 99 is mounted on a base 107, as is the motor 105. The shaft 100 is supported for rotation on roller bearings 108 provided In the yoke 103. It is also supported by a collar 109 which is mounted on the yoke 103 and oppositely facing taper roller thrust bearings 110,111 between the shaft 100 and the collar 109 mount the shaft 100 for rotation and also allow axial thrust (axial to the shaft 100) to be reacted to the yoke 103.

The input shaft 100 has a large flywheel 112 mounted on it, that is a flywheel possessing a large angular moment of inertia. In this respect the flywheel 112 corresponds to the swash plate 12 in the arrangement of FIGS. 1 and 2.

The reciprocating member 104 comprises a cylindrical body 113 which is attached to an end member (or output ram) 114. The output ram 114 has attachment means (not shown) to attach a workpiece holder to it (the workpiece holder is not shown). The output shaft 101 is mounted in the body 113 for rotation by roller bearings 115. Oppositely facing taper roller thrust bearings 11 and 117 are provided to allow the shaft 101 to rotate in the member 104 and transfer axial force to it in the forward and reverse directions along the central axis of the shaft 101. The reciprocating member 104 is guided for linear reciprocatory movement by bearing 118 provided between the member 104 and a support structure 121, and by bearing 119 provided between the end member 114 and a face plate 120.

The input shaft 100 has a central axis 130. The output shaft 101 has a central axis 131.

Figure 5:
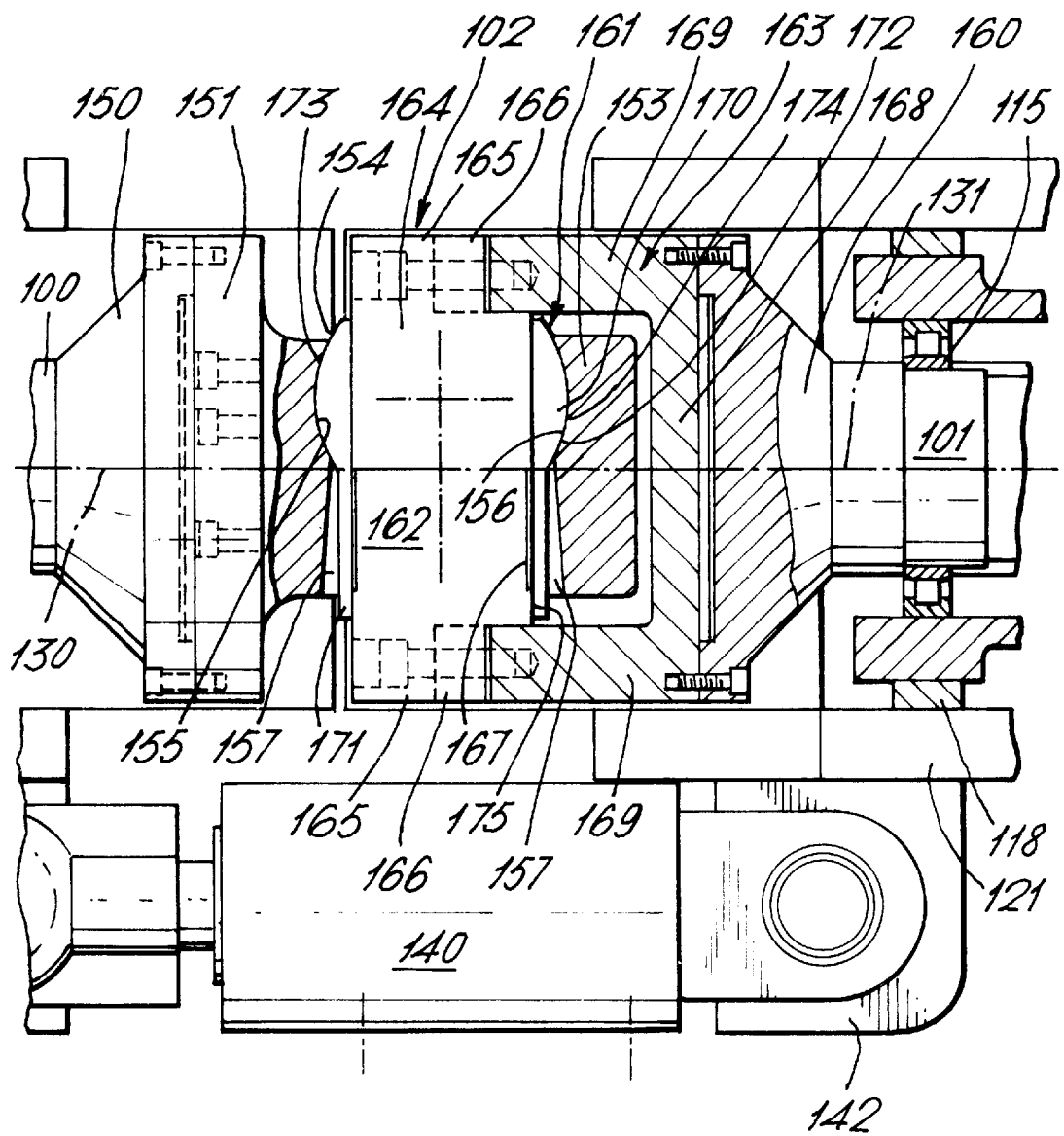
FIG. 5 shows detail of coupling means coupling the input and output shafts of the machine of FIG. 3.

A linear hydraulic actuator 140 is provided acting between a lug 141 provided on the yoke 103 and a lug 142 provided on the support structure 121. The yoke 103 is pivotally connected to the support structure 121 via a pair of pivots 143 and 144 (shown in FIG. 4). When the actuator 140 is actuated the yoke 103 is pivoted about pivots 143 and 144, up out of the page of FIG. 4 (upwards in FIG. 3). The input shaft 100 is carried with the yoke and is misaligned relative to the output shaft 101 when the actuator 140 is actuated. The coupling means 102 permits this misalignment whilst still remaining able to carry a rotary drive to the output shaft 101 (more importantly it permits re-alignment whilst the shafts 100 and 101 are rotating). The coupling means is best shown in FIG. 5.

The forward end of the input shaft 100 is provided with a flange formation 150 to which is bolted a socket member 151. The socket member 151 has a C-shaped end cap 153 removably bolted to it (bolts not shown) so as to define in combination a part-spherical socket having a curved bearing surface 154 having a push region 155 and a pull region 156 defined by the socket member 151, the surface 154 being part of a sphere.

The socket 151 and cap 153 are provided with skirt regions containing rebated regions 157 which partiallly enclose the tail 171 of the ball member. The rebates are able to accommodate movements of other parts of the coupling means 102.

The output shaft 101 has a flange formation 160 at one end and a ball member 161 is mounted on the flange formation 160 via a support member 162 which is in turn bolted to a bridge member 163 which is in turn bolted to the flange formation 160.

The support member 162 comprises a cylindrical pin portion 164 having mounting lugs 165 at each end, the mounting lugs 165 having a V-shaped wedge projection 166. The pin has an annular groove 167 towards one end.

The bridge member 163 comprises a mounting plate 168 from which extends a pair of arms 169 which have V-shaped recesses complementary to the projections 166.

The ball member 161 comprises a hollow spigot with a cylindrical internal bore and has a ball formation 170 at one end and a counterbalance tail 171 at the other end. The ball formation 170 has part-spherical bearing surface 172 complementary to the bearing surface 154. The surface 172 has a push region 173 and a pull region 174.

The ball member 161 is free to slide slightly on the pin portion 164, in the direction of the axis of the pin portion 164.

The part-spherical bearing surfaces 154 and 172 are capable of sliding relative movement as the input shaft 100 rotates (when it is misaligned with the output shaft 101).

When the actuator 140 is actuated so as to align the axis 130 of the input shaft 100 with the axis 131 of the output shaft 101, the output shaft rotates and does not reciprocate in the direction of the axis 131.

When the axis 130 is misaligned the bearing surface 154 is made to reciprocate axially in the direction of the axis 131 (which is not reorientated). As the bearing surface 154 moves forwards (in the direction of axis 131) the push bearing surface 155 pushes on surface 172 of the ball 170 and drives the shaft 101 forwards. As the shaft 100 turns further the bearing surface 154 is moved rearwards in relation to the direction of axis 131 an the pull bearing surface 156 pulls on the surface 172 of the ball and pulls the shaft 101 rearwards. In order to allow the misaligned input shaft 100 to rotate and the output shaft 101 to rotate and reciprocate the surfaces 155 and 173, and 169 and 174 slide relative to each other and experience cyclical compression and relaxation. This assists in lubrication of the bearing surfaces. The ball member 153 is also capable of sliding on pin portion 162 driving the reciprocation of shaft 101 (to accommodate the changes in geometry at the coupling means).

The annular groove 167 helps to define a localised annular bearing surface references 175, at the end of the pin portion 162, and may also help to provide a reservoir of lubricating oil. We shall probably provide a pressure feed of oil through oilways (the shaft bearings may be mist-lubricated). Benefits of having a localised, small bearing surface 175 is that it reduces sticking of the tail 171 on the pin 162, and helps to prevent any twisting. A similar concept is used on shaft 100 and 101.

The centre of gravity of the ball member (ball and tail) lies on the axis 100. The centrifugal forces are substantially balanced, and this allows us to rotate the shafts at high speeds (50 Hz, 100 Hz, or more).

As will be appreciated, the flexible drive belts 106 can accommodate movement of the input shaft 100 to re-align it from a misaligned position whilst still operating.

The flywheel 112 allows us to generate high angular momentum from a relatively low power electric motor: some or most of the energy of a weld being provided by the flywheel, which can then be powered up over an extended period by the electric motor before the next weld.

One feature not yet described is counterbalance means 180 provided coupled to the reciprocating member 104. These are shown in FIG. 4. The purpose of the counterbalance means 180 is to avoid having to react linear momentum changes in the reciprocating output shaft 101 back to the mounting frame of the machine.

The counterbalance means 180 comprises a pair of counterbalances 181 guided for linear reciprocatory movement by guides 182, and coupled to a first arm of rockers 183 which are pivoted about pivots 184. The rockers 183 each have a second arm that is coupled to the reciprocating member 104. The coupling of rockers 183 to the counterbalances 181 and to the reciprocating member 104 is by flexible elements 185, which typically comprise flexible metal blades. As the output shaft 101, and the reciprocatory member 104 move forwards so the counterbalances slide backwards. The mass of the counterbalances 181 is such that the linear momentum in the direction of axis 101 is substantially zero. The use of flexible blades rigidly fixed to the member 104 and the counterbalances avoids us having to use pin and hole bearings and avoids any problems with lubrication, alignment and backlash, at such pin and hole bearings.

The oscillator of FIGS. 3 to 5 is designed for high axial loads in the direction of axis 131. The pin portion 164 upon which the ball of the embodiment of FIGS. 3 to 5 is mounted is supported at both ends by the arms 168. This arrangement can transmit high axial loads but has mass radially outside of the ball/socket bearing surfaces. This mass, placed relatively far from the axis of rotation limits the speed of rotation of the coupling as centrifugal forces become too great at high speeds. For high speed rotation we prefer to have less mass radially outside of the ball/socket bearing surfaces. This is achieved in the third embodiment by using a cantilever mounting to concentrate the mass on the rotational centre so as to minimise centrifugal force effects. For speeds above 120 Hz, possibly for speed up to 160 Hz or 180 Hz, and perhaps above even that, we prefer to use a different version of the machine. This is shown in FIGS. 6 and 7.

Figure 6:
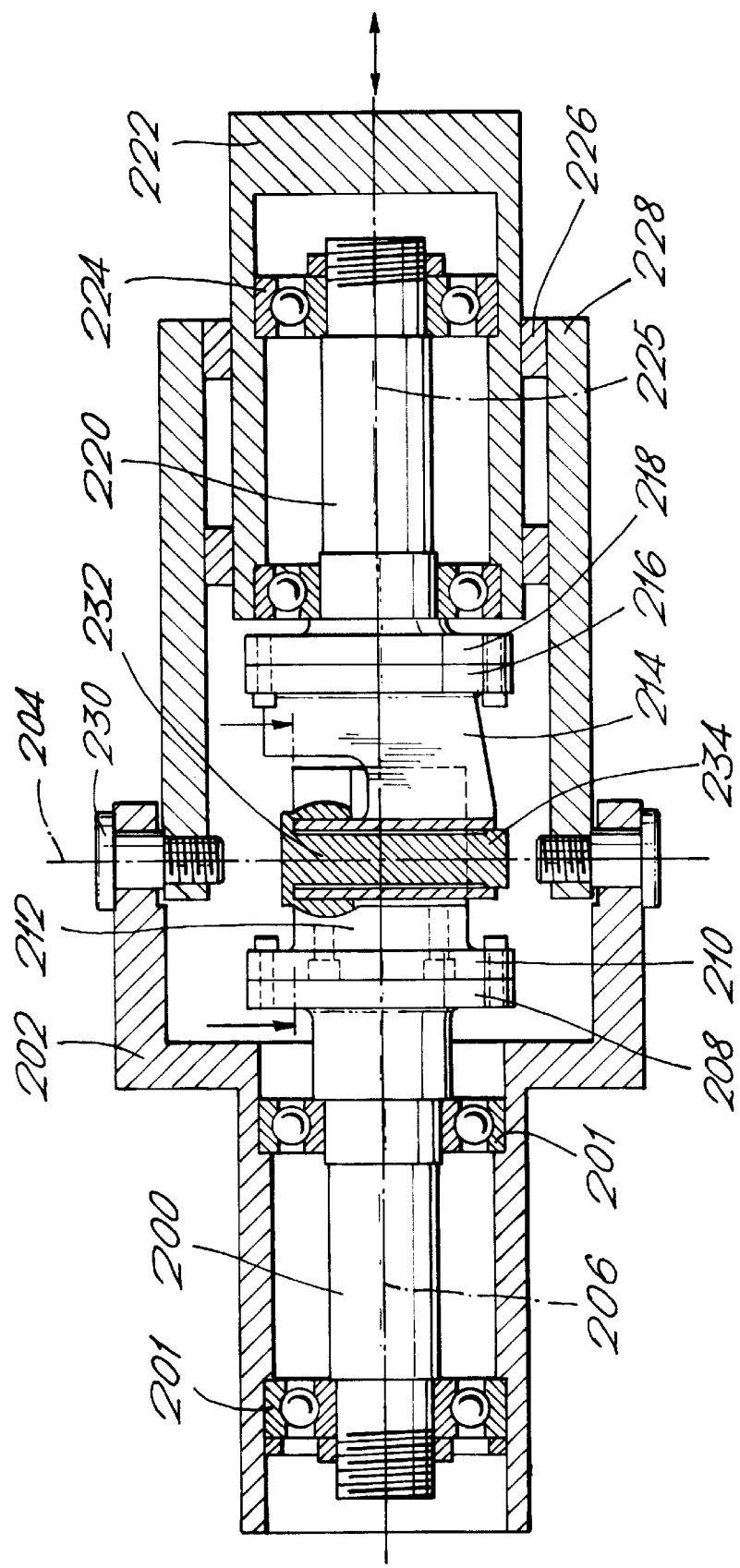
FIG. 6 shows schematically a plan view of a third friction welding machine.
Figure 7:
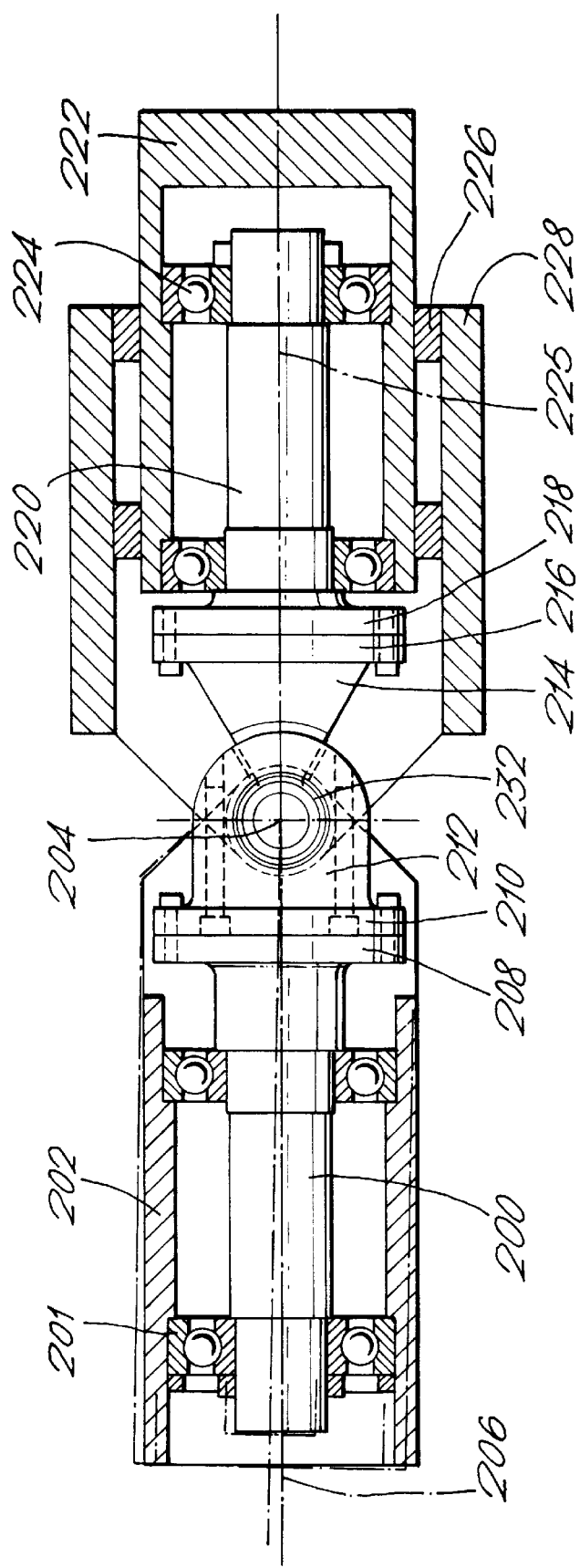
FIG. 7 shows schematically a side view of the machine of FIG. 6.

The high speed oscillator of FIGS. 6 and 7 is designed to operate at up to 180 Hz, and can transmit an axial welding load of up to 6 tonnes. The oscillator comprises a prime mover in the form of an input shaft 200 having a central axis 206 mounted by roller bearings 201 in a housing 202, and driven by a motor (not shown). The input shaft 200 is pivotable about a pivot axis 204, and the axis 206 of the shaft 200 intersects the pivot axis 204. The input shaft is provided with a first mounting flange 208 which is in turn connected to a second mounting flange 210. The second mounting flange 210 carries socket-defining member 212.

A hollow support member 214 is carried by a first output ram flange 216 which is connected to a second output ram flange 218 provided on an output shaft 220. The output shaft 220 in turn carries a ram output member 222 by means of ball bearings 224. The output shaft 220 has a central axis 225 and this also intersects the pivot axis 204. The ram output member 222 is constrained by sliding bearings 226 to slide linearly in a second housing 228. The first and second housings 202 and 228 are pivotally connected by pivots 230.

The bearings 224 are fixed in a similar fashion to bearings 32a, 32b, already described, and are therefore capable of transferring axial load from the output shaft 220 while retaining freedom to rotate relative thereto.

A ball 232 is provided with a tail 234. The ball 232 has an annular groove in it to accommodate the support member 214. The tail has a recessed annular groove along most of its length to provide spaced bearing surfaces, beyond the length of the groove. The ball engages the socket of the socket-defining member 212.

In operation, the prime mover is pivoted about the pivot axis 104 such that the input shaft axis 206 is not in line with the output shaft axis 225. The motor is then energised to rotate the shaft 200 and hence the socket-defining member 2121. This in turn rotates the ball 234, which rotation causes the ram output member 222 to rotate. Due to the misalignment between the input shaft axis 216 and the output shaft axis 225, rotation of the input shaft also causes reciprocal motion of the output shaft 200. The output shaft 200 is able to freely rotate relative to the ram output member 222, but any axial load is transferred from the input shaft to the member, which is therefore caused to reciprocate with the input shaft.

The centre of gravity of the ball and tail is arranged to coincide with the centre of rotation of the output shaft. Little or no centrifugal force therefore acts on the ball and tail, with consequent reduction in the stress thereon. High operational speed of rotation of the shaft can then be used. The use of ball bearings 201 and 224 increases the rotational speed that can be achieved but reduces the axial loads that can be transferred.

The ball arrangement 232 in the embodiment in FIGS. 6 and 7 has a smaller moment of inertia about the central axis of the output shaft then does the arrangement of FIGS. 3 and 5 because there is less "wasted" mass radially beyond the ball bearing surfaces of the ball ("wasted" in the sense that the only purpose of material radially beyond the ball, at the ball end of the ball and tail, is to support the ball). The cantilever arrangement of FIGS. 6 and 7 (instead of a yoke supporting the pin at both ends) has substantially no mass beyond the ball. This minimises centrifugal forces. The counterbalance tail, of course, is to one side only of the ball. The arrangement is designed to concentrate the mass near the centre so as to minimise the centrifugal force acting on the parts.

The output shaft is rotated at generally the same speed as the input shaft, but when the two shafts are misaligned there is a degree of "flutter" in the speed of the output shaft, the angular velocity of the output shaft being sinusoidally perturbed about the "average" speed.

I claim:

1. A method of operating a linear friction welding machine comprising rotating an input shaft about a first axis, mounting an output shaft for rotation about a second axis and for reciprocation in the direction of the second axis, drivingly connecting the output shaft to a welding ram constrained for linear reciprocal movement in the direction of the second axis, coupling the input shaft to the output shaft so that rotation of the input shaft rotates the output shaft, and arranging that the first and second axes are relatively angularly movable out of co-axial alignment so that when mis-aligned the input shaft has reciprocal linear component of movement in the direction of the second axis which drives the output shaft and welding ram reciprocally in the direction of the second axis.

2. A linear friction welding oscillator comprising an input shaft rotatable about a first axis, an output shaft rotatable about a second axis, axis movement means adapted to move the angle of the input shaft relative to the axis of the output shaft, coupling means having an input component rotatable with the input shaft and spaced radially from the first axis, and an output component rotatable with the output shaft adapted to couple the input shaft with the output shaft for rotational movement thereby to drive the output shaft, the arrangement being such that when the first and second axes are aligned the input component rotates so as to have no axial movement in the direction of the second axis, but when the first axis is inclined with respect to the second axis the input component rotates so that as it rotates about the first axis it also reciprocates with respect to the second axis thereby causing the output shaft to reciprocate in the direction of the second axis.

3. A linear friction welding machine comprising an oscillator as claimed in claim 2, a rotary prime mover connected to drive the input shaft, and a ram member constrained to reciprocate in an axial direction connected to be driven by the output shaft.

4. A linear friction welding oscillator as claimed in claim 2 wherein the output component of the coupling means is arranged to rotatably drive the output shaft.

5. A linear friction welding oscillator as claimed in claim 2 wherein the output component is engaged with the output shaft at a location offset from the second axis.

6. A linear friction welding oscillator as claimed in claim 2 wherein the input shaft is coupled to high inertia means.

7. A linear friction welding oscillator as claimed in claim 6 wherein the high inertia means comprises a swash plate to which the input component of the coupling means is attached.

8. A linear friction welding oscillator as claimed in claim 2 wherein the axis movement means comprise a pivotable yoke rotatable about a pivot axis which intersects the first axis orthogonally.

9. A linear friction welding oscillator as claimed in claim 8 wherein the yoke carries a prime mover coupled to drive the input shaft.

10. A linear friction welding oscillator as claimed in claim 9 wherein the prime mover is a rotary machine.

11. A linear friction welding oscillator as claimed in claim 2 wherein the coupling means comprises at least one flexible, inextensible element.

12. A linear friction welding oscillator as claimed in claim 11 wherein the flexible, inextensible element comprises a steel bending element.

13. A linear friction welding oscillator as claimed in claim 11 further comprising balance means coupled with the output shaft and wherein the coupling means includes a second flexible, inextensible element drivingly connected to said balance means.

14. A linear friction welding oscillator as claimed in claim 13 wherein the balance means is mounted for rotation concentrically with the output shaft.

15. A linear friction welding oscillator as claimed in claim 2 wherein the coupling means comprises a ball and socket arrangement.

16. A linear friction welding oscillator as claimed in claim 15 wherein the ball and socket are offset from the first axis.

17. A linear friction welding oscillator as claimed in claim 15 wherein the ball is held on a peg between the input and output components of the coupling means.

18. A linear friction welding oscillator as claimed in claim 15 wherein the ball is provided with a counterbalance in the form of a tail and the socket includes a skirt to accommodate the tail of the ball.

19. A linear friction welding oscillator as claimed in claim 18 wherein centre of gravity of the ball and tail is arranged to lie on the first axis.

* * * * *